United States Patent
Gordon et al.

(10) Patent No.: US 9,377,790 B2
(45) Date of Patent: Jun. 28, 2016

(54) METHOD FOR REMOTELY MANAGING AN ENVIRONMENTAL CONTROL AND MONITORING DEVICE

(75) Inventors: Michael Gordon, Warren, NJ (US); J. Henry Scott, Warren, NJ (US); Edward J. Laganis, Hoboken, NJ (US); James M. Judge, Bushkill, PA (US); Keith Armonaitis, Rockaway, NJ (US)

(73) Assignee: Innovaci Inc., New Brunswick, NJ (US)

( * ) Notice: Subject to any disclaimer, the term of this patent is extended or adjusted under 35 U.S.C. 154(b) by 402 days.

(21) Appl. No.: 13/566,776

(22) Filed: Aug. 3, 2012

(65) Prior Publication Data
US 2013/0138225 A1 May 30, 2013

Related U.S. Application Data

(60) Provisional application No. 61/514,675, filed on Aug. 3, 2011.

(51) Int. Cl.
*G05B 13/02* (2006.01)
*G06F 19/00* (2011.01)
(Continued)

(52) U.S. Cl.
CPC ............ *G05D 23/19* (2013.01); *G05B 13/0205* (2013.01); *G05B 19/0421* (2013.01); *H04L 12/2823* (2013.01); *G05B 2219/23336* (2013.01); *G05B 2219/24048* (2013.01)

(58) Field of Classification Search
CPC ......... G05D 23/19; G05D 23/00; G05D 5/00; G05D 17/00; G05D 3/12; G05D 9/00; G05B 21/00; G05B 13/00; G05B 13/02; G05B 19/04; G05B 15/02; G05B 15/00; G05B 2219/23; G05B 2219/26; G05B 2219/24; G06Q 20/14; G06Q 10/06; G06Q 50/06; H04L 12/28; A01K 63/00
USPC ...................... 700/33, 295, 277, 278; 705/34; 119/245; 236/1, 51
See application file for complete search history.

(56) References Cited

U.S. PATENT DOCUMENTS 3,292,821 A 12/1966 James
3,651,466 A 3/1972 Galpin
(Continued)

FOREIGN PATENT DOCUMENTS

CN 1208791 A 2/1999
EP 1380909 A2 1/2004
(Continued)

OTHER PUBLICATIONS

Notification of Reasons for Refusal issued on Jul. 15, 2014, for corresponding Japanese patent application No. 2013-542110, 4 pgs.
(Continued)

*Primary Examiner* — Mohammad Ali
*Assistant Examiner* — Md Azad
(74) *Attorney, Agent, or Firm* — Chiesa Shahinian & Giantomasi PC

(57) ABSTRACT

Methods, apparatuses, and computer readable media for remotely managing an environmental control and monitoring device are provided. Remote management of an environmental control and monitoring device may be implemented by receiving, via a network, a device action including notification of at least one of an environmental, maintenance, repair or usage status of an environmental control and monitoring device. A management action is determined based on the device action, and the management action is transmitted, wherein the management action includes a command to execute an operation of the environmental control and monitoring device.

41 Claims, 9 Drawing Sheets

(51) Int. Cl.
  *G05B 13/00* (2006.01)
  *G08C 15/06* (2006.01)
  *A01K 63/00* (2006.01)
  *G05D 23/19* (2006.01)
  *G05B 19/042* (2006.01)
  *H04L 12/28* (2006.01)

(56) References Cited

U.S. PATENT DOCUMENTS

| | | |
|---|---|---|
| 5,339,250 A | 8/1994 | Durbin |
| 5,619,024 A | 4/1997 | Kolls |
| 5,859,778 A | 1/1999 | Kuroda et al. |
| 5,890,520 A | 4/1999 | Johnson |
| 5,895,457 A | 4/1999 | Kurowski et al. |
| 5,971,273 A | 10/1999 | Vallaire |
| 6,038,491 A | 3/2000 | Mcgarry et al. |
| 6,061,668 A | 5/2000 | Sharrow |
| 6,123,223 A | 9/2000 | Watkins |
| 6,230,150 B1 | 5/2001 | Walker et al. |
| 6,330,490 B1 | 12/2001 | Kim et al. |
| 6,457,038 B1 | 9/2002 | Defosse |
| 6,466,920 B1 | 10/2002 | Okayama et al. |
| 6,539,570 B2 | 4/2003 | Youn et al. |
| 6,917,279 B1 | 7/2005 | Thomas et al. |
| 7,079,922 B2 | 7/2006 | Komai |
| 7,081,830 B2 | 7/2006 | Shimba et al. |
| 7,253,729 B2 | 8/2007 | Glasser et al. |
| 7,295,099 B2 | 11/2007 | Lee et al. |
| 7,529,597 B1 | 5/2009 | Hertz et al. |
| 7,552,094 B2 | 6/2009 | Park et al. |
| 7,734,371 B2 | 6/2010 | Garneau |
| 8,145,357 B2 * | 3/2012 | Nibler et al. ............ 700/276 |
| 2001/0020198 A1 | 9/2001 | Wilson |
| 2001/0034566 A1 | 10/2001 | Offer |
| 2002/0016829 A1 | 2/2002 | Defosse |
| 2002/0026366 A1 | 2/2002 | Ohtsuki et al. |
| 2002/0032491 A1 | 3/2002 | Imamura et al. |
| 2002/0128853 A1 | 9/2002 | Kikuchi et al. |
| 2002/0165787 A1 | 11/2002 | Bates et al. |
| 2002/0194137 A1 | 12/2002 | Park et al. |
| 2003/0014369 A1 | 1/2003 | Okayama et al. |
| 2003/0033243 A1 | 2/2003 | Baker et al. |
| 2003/0154170 A1 | 8/2003 | Komai |
| 2003/0155417 A1 | 8/2003 | Fairman |
| 2003/0167178 A1 | 9/2003 | Jarman et al. |
| 2004/0044438 A1 | 3/2004 | Lorraine et al. |
| 2004/0054601 A1 | 3/2004 | Carapelli |
| 2004/0206814 A1 | 10/2004 | Kawai et al. |
| 2004/0225516 A1 | 11/2004 | Bruskotter et al. |
| 2005/0119765 A1 | 6/2005 | Bergman et al. |
| 2006/0013234 A1 | 1/2006 | Thomas et al. |
| 2006/0111816 A1 | 5/2006 | Spalink et al. |
| 2007/0093934 A1 | 4/2007 | Garneau |
| 2007/0251461 A1 * | 11/2007 | Reichard et al. ............... 119/245 |
| 2008/0015873 A1 | 1/2008 | Shostack et al. |
| 2008/0183752 A1 | 7/2008 | Jain |
| 2009/0210096 A1 | 8/2009 | Stack et al. |
| 2011/0183733 A1 | 7/2011 | Yoshida et al. |
| 2011/0196547 A1 * | 8/2011 | Park et al. ............... 700/296 |
| 2011/0254697 A1 * | 10/2011 | Casey et al. ............... 340/870.02 |
| 2012/0066023 A1 | 3/2012 | Xia et al. |

FOREIGN PATENT DOCUMENTS

| | | |
|---|---|---|
| JP | 2003203111 A | 7/2003 |
| JP | 2004213218 A | 7/2004 |
| WO | 2006047539 A2 | 5/2006 |
| WO | 2006055334 A1 | 5/2006 |

OTHER PUBLICATIONS

Notification of Results of Checking Patentability mailed on Jul. 17, 2014, in connection with Russian Patent Application No. 2013125461, 9 pgs.

PCT International Search Report corresponding to PCT Application No. PCT/US2012/049596, filed Aug. 3, 2012, International Search Report issued Apr. 18, 2013, pp. 1-4.

PCT Written Opinion of the International Searching Authority corresponding to PCT Application No. PCT/US2012/049596, filed Aug. 3, 2012, Written Opinion issued Apr. 18, 2013, pp. 5-13.

Office Action dated on Feb. 24, 2015, in connection with Canadian Patent Application No. 2,817,416, 4 pgs.

Office Action mailed on Oct. 9, 2015, in connection with European Patent Application No. 11801905.8, 7 pgs.

Office Action mailed on Aug. 24, 2015, in connection with Chinese Patent Application No. 201280048950.0, 29 pgs.

Office Action dated Mar. 19, 2015 in connection with Chinese Patent Application No. 201180057797.3, 15 pgs.

* cited by examiner

DATA STRINGS AND DIAGNOSTIC CODES FOR HYDROTHERAPY SYSTEM

| ACTION CODE (200) | DESCRIPTION/FUNCTION (202) | SEND PRIORITY (I = IMMEDIATE, C = NEXT CHECK-IN INTERVAL) (204) | TIMING PERIOD ESTIMATED & ACTUAL (206) | SCREEN TO DISPLAY MESSAGE (208) | MESSAGE TO DISPLAY (208) | OTHER ACTION TAKEN (210) |
|---|---|---|---|---|---|---|
| 00 | SYSTEM OK CHECK-IN | - | CHECK-IN INTERVAL = 6X/DAY 24/7 | N | | |
| 01 | INITIATE TRANSACTION-UNLOCK FOR 24 HOURS | I | 2X WEEK (EST.) | Y | ONCHARGE | |
| 02 | CONNECTION CHECK DATA SENT CONFIRM | I | BASED ON CODE 01 | Y | FUNCTION BUTTONS | |
| 03 | POWERED UP | I | INITIAL/MOVED DEVICE 2X/YR (EST.) | Y | BOOT UP SCREENS | |
| 04 | REQUEST CONFIGURATION | 1X/MO. AT C | ONCE MO. | N | | |
| 05-09 | (RESERVED) | | | - | | |
| 10 | TRANSACTION COMPLETE SYSTEM UNLOCKED | C | BASED ON CODE 01 | N | | |
| 11 | SYSTEM ON | C | BASED ON CODE 01 | Y | "YES" BUTTON | |
| 12 | SYSTEM OFF | C | DURING ACTIVE TRANSACTION PERIOD | Y | EXIT/CANCEL | |
| 13 | TIMED OUT | I | BASED ON CODE 01 | N | | |
| 14 | DEMO MODE | C | 4X WEEK (EST.) | Y | DEMO SCREEN | |
| 15 | TRANSACTION NOT ACCEPTED | C | 1X MONTH? | Y | "NO" BUTTON ON ACCEPT SCREEN | |
| 16-19 | (RESERVED) | - | . | | | |
| 20 | CELL SIGNAL STRENGTH | C | EVERY 4 HRS | N | | |
| 21-39 | (RESERVED) | | | | | |
| 40 | CONFIGURATION RECEIVED | I | 1-2 TIMES A YEAR (EST.) | N | | |
| 41-49 | (RESERVED) | | | | | |
| 90 | TANK UVC BULB OUT | C | EVERY 5000HRS (EST.) | N | | EMAILS SENT OUT |
| 91 | UNIT FAN FAILURE | C | EVERY 15000HRS (EST.) | N | | EMAILS SENT OUT |
| 92 | SIGNAL WEAK | C | NA | N | | NOTE IN DBASE |
| 93 | UNIT UNPLUGGED - RE-POWERED UP | I | NA | N | | NOTE IN DBASE |
| 94 | WATER PUMP FAILURE | C | EVERY 10000HRS (EST.) | N | | EMAILS SENT OUT |
| 95 | SCENT TRAY MOTOR ERROR | C | NA | Y | | EMAILS SENT OUT |
| 96 | TRANDUCER FAILURE | C | EVERY 5000HRS (EST.) | Y | | EMAILS SENT OUT |
| 97 | TANK EMPTY - SCREEN INDICATOR | C | 1X/DAY (EST.) | Y | CHECK SCENT TRAY | EMAILS SENT OUT |
| 98 | CHANGE AIR FILTER (INDICATOR ONLY IN SETTINGS) | C | 6MO. (EST.) | N | WATER TANK SCREEN | EMAILS SENT OUT |
| 99 | CHANGE SCENT TRAY (INDICATOR ONLY IN SETTINGS) | C | 6MO. (EST.) | N | | EMAILS SENT OUT |
| 50 | ALL ON/ALL OFF BUTTON | C | BASED ON CODE 01 | NA | | |
| 51 | FAN OFF | C | BASED ON CODE 01 | NA | | |
| 52 | FAN LOW | C | BASED ON CODE 01 | NA | | |

FIG. 2

METHOD FOR REMOTELY MANAGING AN ENVIRONMENTAL CONTROL AND MONITORING DEVICE

RELATED APPLICATIONS

This application claims the benefit of U.S. Provisional Application No. 61/514,675, filed Aug. 3, 2011, the disclosure of which is herein incorporated by reference.

TECHNICAL FIELD

The present disclosure is generally directed to device management, and more specifically to managing networked devices.

BACKGROUND

Environmental control is useful for creating comfortable indoor environments. Environmental control may be employed in a home, or in a commercial setting such as a hotel room, office cubicle or cruise ship stateroom. A variety of devices such as air purifiers, humidifiers, and fragrance diffusers may be employed in an environmental control system, and data related to the usage of these devices may be useful for optimizing environmental control.

Environmental control may also include monitoring user actions to determine what types of relevant user actions are taken within a monitored environment, and when such actions are performed. Data related to user actions, in combination with data related to the usage of various devices, may be employed to further optimize environmental control. Therefore, it would be advantageous to manage data obtained from various sources to implement more effective environmental control and monitoring systems.

SUMMARY

Methods, apparatuses, and computer readable media for remotely managing an environmental control and monitoring device are provided. In accordance with an embodiment, remote management of an environmental control and monitoring device may be implemented by receiving, via a network, a device action including notification of at least one of an environmental, maintenance, repair or usage status of an environmental control and monitoring device. A management action is determined based on the device action, and the management action is transmitted, wherein the management action includes a command to execute an operation of the environmental control and monitoring device. The operation of transmitting the management action may include determining to transmit one of a software update, a control message or authorization information to the environmental control and monitoring device. The management action may be transmitted at regular intervals or wirelessly. The environmental control and monitoring device may comprise one of a clothes washer, clothes dryer, refrigerator, HVAC unit, air purifier, humidifier or fragrance device, and may be located in one of a hotel room, cruise ship stateroom or office.

In accordance with an embodiment, a management action associated with billing a user of the environmental control and monitoring device may be transmitted based on the device action.

In accordance with an embodiment, the device action may be associated with one or more user actions monitored by the environmental control and monitoring device. The device action may include a record of one or more previous device actions or user actions, and the device action may indicate one of a consumable resource level, filter status or request from a user of the environmental control and monitoring device.

In accordance with an embodiment, one or more device actions may be received from a plurality of environmental control and monitoring devices. A device action associated with a particular environmental control and monitoring device may be determined based on a unique identifier of the particular environmental control and monitoring device. One or more device actions may be stored in relation to a particular environmental control and monitoring device.

In accordance with an embodiment, the device action may comprise a device code, and determining the management action may be based, at least in part, on the device code.

These and other advantages of the invention will be apparent to those of ordinary skill in the art by reference to the following detailed description and the accompanying drawings.

DETAILED DESCRIPTION

In accordance with the various embodiments, a method for remotely managing an environmental control and monitoring device are disclosed. For example, remotely managing an environmental control and monitoring device may include receiving, via a network, a device action including notification of at least one of an environmental, maintenance, repair or usage status of an environmental control and monitoring device. A management action is determined based on the device action, and the management action is transmitted, wherein the management action includes a command to execute an operation of the environmental control and monitoring device.

Figure 1:
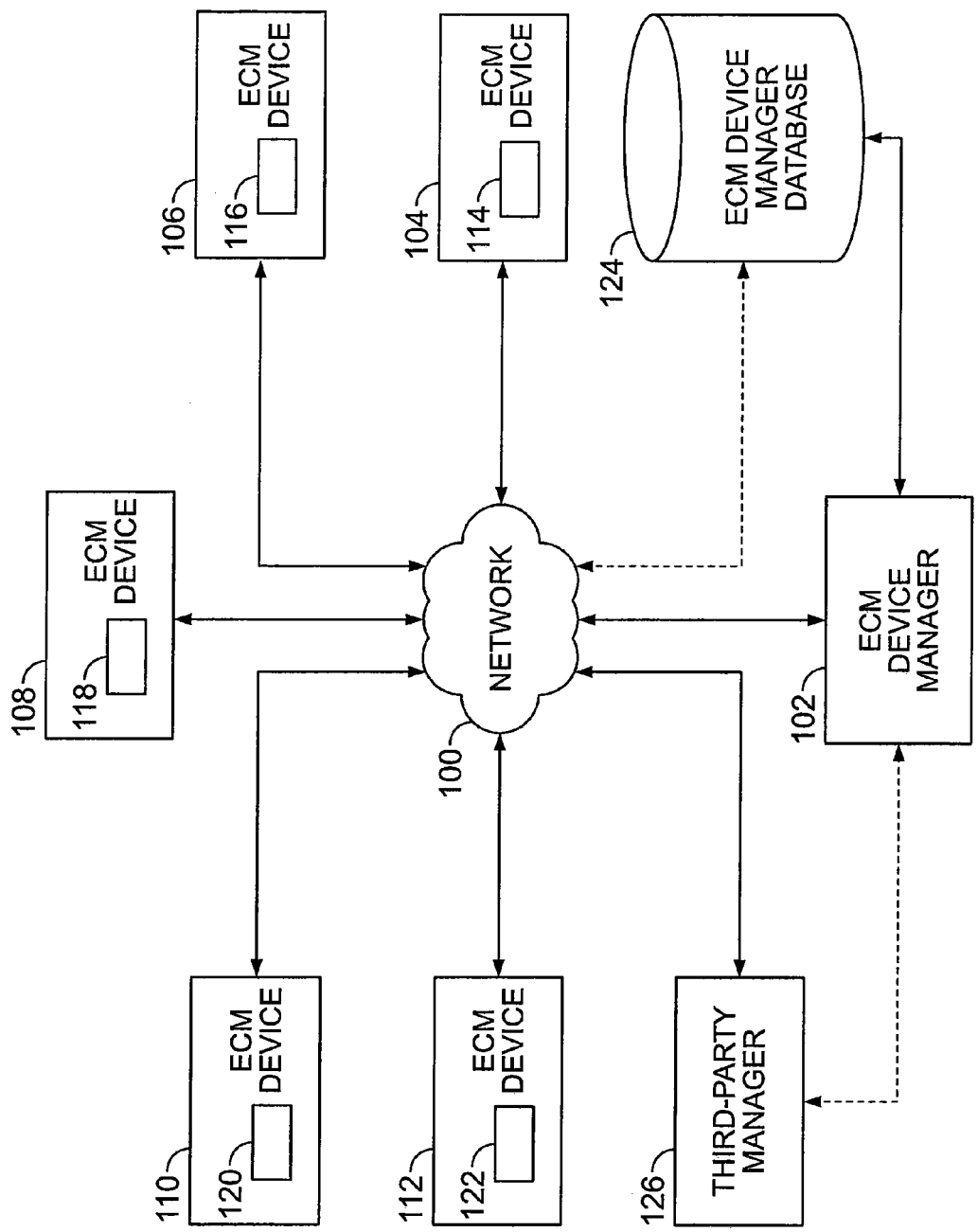
FIG. 1 is a diagram showing a networked environment for remotely managing one or more environmental control and monitoring devices in accordance with an embodiment.

FIG. 1 is a diagram showing a networked environment for remotely managing one or more environmental control and monitoring devices in accordance with an embodiment. For example, network 100 may be accessible via an interface of environmental control and monitoring device manager 102 for communication with one or more remotely located environmental control and monitoring devices 104, 106, 108, 110 and 112 (also referred to herein as "devices", or singularly as a "device" or "ECM device"). Environmental control and monitoring device manager 102 can be utilized for managing one or more environmental control and monitoring devices 104, 106, 108, 110 and 112. In one embodiment, environmental control and monitoring device manager 102 may track usage, monitor maintenance status and remotely control environmental control and monitoring devices 104, 106, 108, 110 and 112. For example, environmental control and monitoring device manager 102 may receive notifications regarding usage or an operating status of one or more environmental control and monitoring devices 104, 106, 108, 110 and 112 via network 100. In one embodiment, the one or more environmental control and monitoring devices 104, 106, 108, 110 and 112 are network-capable devices used for environmental control and monitoring of indoor areas, such as room heaters and coolers (i.e., HVAC units), air purifiers, humidifiers or fragrance devices. Additional examples of environmental control and monitoring devices 104, 106, 108, 110 and 112 may include furnaces, smoke detectors and carbon monoxide detectors. In other embodiments, the environmental control and monitoring devices 104, 106, 108, 110 and 112 can include clothes washers, clothes dryers, refrigerators and other appliances that may be used in a home or commercial setting.

An exemplary environmental control and monitoring device, e.g., device 104, may include a networking module 114. In one embodiment, networking modules 114, 116, 118, 120 and 122 may be cellular data modules that are capable of data communication with environmental control and monitoring device manager 102, such as via network 100. Each networking module 114, 116, 118, 120 and 122 may include a printed circuit board (PCB) having a unique identifier that may be associated with a corresponding environmental control and monitoring device 104, 106, 108, 110 and 112. For example, the unique identifier may be a network serial number such as a CDMA Mobile Equipment Identifier (MEID). One skilled in the art will note that environmental control and monitoring devices 104, 106, 108, 110 and 112 may communicate with network 200 using any of a variety of wired (e.g., USB, Firewire, LAN, etc.) or wireless (e.g., CDMA, GSM, Wi-Fi, Bluetooth, etc.) formats.

In one embodiment, a unique identifier may be used for remotely managing an associated environmental control and monitoring device, e.g., device 104. For example, prior to deploying an environmental control and monitoring device 104 in a commercial environment (e.g., in a hotel room), a unique identifier associated with the environmental control and monitoring device 104 may be recorded along with other data, such as the country, city, hotel and room number where the environmental control and monitoring device 104 will be located. The unique identifier and other data relating to the environmental control and monitoring device 104 then may be stored in an environmental control and monitoring device manager database 124 (also referred to herein as database 124). In one embodiment, information may be received and cross-referenced to a unique identifier associated with a particular environmental control and monitoring device by the environmental control and monitoring device manager 102. The environmental control and monitoring device manager 102 may then store the information at database 124 in relation to the particular environmental control and monitoring device 104. Alternatively, environmental control and monitoring device manager 102 may receive and cross-reference information (e.g., associated with a unique identifier) from a third-party manager 126, such as by transmitting a command as part of a check routine to third-party manager 126 either via network 100 or a direct connection.

Information may be stored at database 124 in any of a variety of ways. For example, the information communicated via a stock keeping unit (SKU) scanner or similar handheld device. One skilled in the art will also note that standard technologies can be utilized for entering data into database 124 such as bar code, RFID and 3D video scanning. Alternatively, database 124 may receive unique identifiers and other data relating to the environmental control and monitoring devices 104, 106, 108, 110 and 112 directly from network 100, such as by an operation of a web-enabled application operating within network 100.

In certain embodiments, the environmental control and monitoring device manager database 124 will not just store information incoming from each environmental control and monitoring device, but also interact with the environmental control and monitoring devices and be capable of running functions that can purge superfluous data. Such purges can be scheduled so that the database 124 may purge data after a predetermined number of megabytes or at a predetermined time.

One exemplary type of environmental control and monitoring device that can be remotely managed may combine one or more of an air purifier, humidifier or fragrance device. Such a combined function environmental control and monitoring device may include a variety of consumables that must be replaced as a consequence of typical usage. Examples of consumables used by a combined function environmental control and monitoring device may include water, filters, fragrances, de-Mineralization tablets, charcoal filters or other filter types that may be used in water/humidification, or any other consumables that typically may be used in environmental control devices. For example, a combined function environmental control and monitoring device may include a humidifier having a water tank rated for an approximate runtime (e.g., 8-10 hours) without a refill. A combined function environmental control and monitoring device also may include a HEPA-type air purifier, which removes airborne particles and contaminants from the room via a filter (e.g., an odor-absorbing carbon media).

In one embodiment, an environmental control and monitoring device, e.g., device 104, may include an interface (e.g., a sensor or a display) for input/output (I/O) interaction with a user and one or more sensors to monitor a user's habits. For example, the environmental control and monitoring device 104 may collect monitoring data based on a user's habits or when a user performs certain tasks (e.g., laundry or cooking). The monitoring data then may be used by the environmental control and monitoring device 104 to generate a behavioral record or a device action (e.g., a notification) for transmission to environmental control and monitoring device manager 102.

In one embodiment, a device action may include status information regarding an environmental control and monitoring device 104 that is malfunctioning, not responding or reporting an error condition. For example, an environmental control and monitoring device 104 may transmit a device action including a notification that a furnace pilot light is out. A device action also may include a notification that an environmental control and monitoring device 104 is functioning normally or particularly well. Examples of occurrences that may trigger device actions from a device include customer service occurrences, maintenance occurrences, billing procedure occurrences and occurrences relating to marketing information. In one embodiment, occurrences that will trigger device actions may be defined by an organization that is hosting environmental control and monitoring device manager 102.

A device action also may be generated by an environmental control and monitoring device 104 in response to a user input (e.g., for activating a function of the device) or any other user interaction. One example of a user interaction could be opening a lid of a device, such as for monitoring or replenishing a consumable. In one embodiment, a device action may be associated with one or more user actions monitored by an environmental control and monitoring device 104. For example, user actions including an observed usage pattern of an environmental control and monitoring device 104, an observed wake-up time of a user or times when a user leaves or returns to the location of an environmental control and monitoring device 104 may be monitored, and such information may be included in a device action. Further, a device action may include a record of one or more previous devices actions. As such, a correlation can be made based on the record of previous device actions to determine a management action, as described in detail below.

In another embodiment, a device action may comprise a device code (e.g., identifying a particular device or type of device), and a management action may be based, at least in part, on the device code. For example, one or more device actions may be received from a plurality of environmental control and monitoring devices. In such case, a device action may be determined to be associated with a particular environmental control and monitoring device based on a unique identifier (e.g., a serial number or device ID) of the particular environmental control and monitoring device. A transmitted management action may then include the unique identifier of the particular environmental control and monitoring device. For example, the management action may include a unique identifier to convey a command which causes the particular environmental control and monitoring device to execute an operation.

One or more device actions associated with a particular environmental control and monitoring device also may be stored based on a unique identifier, such as in database 124. Currently received or previously stored device actions then may be displayed in relation to a particular environmental control and monitoring device, such as at a user interface of environmental control and monitoring device manager 104. In certain embodiments, the environmental control and monitoring device manager database 124 may store device codes for environmental control and monitoring devices 104 including network location information.

Figure 2:
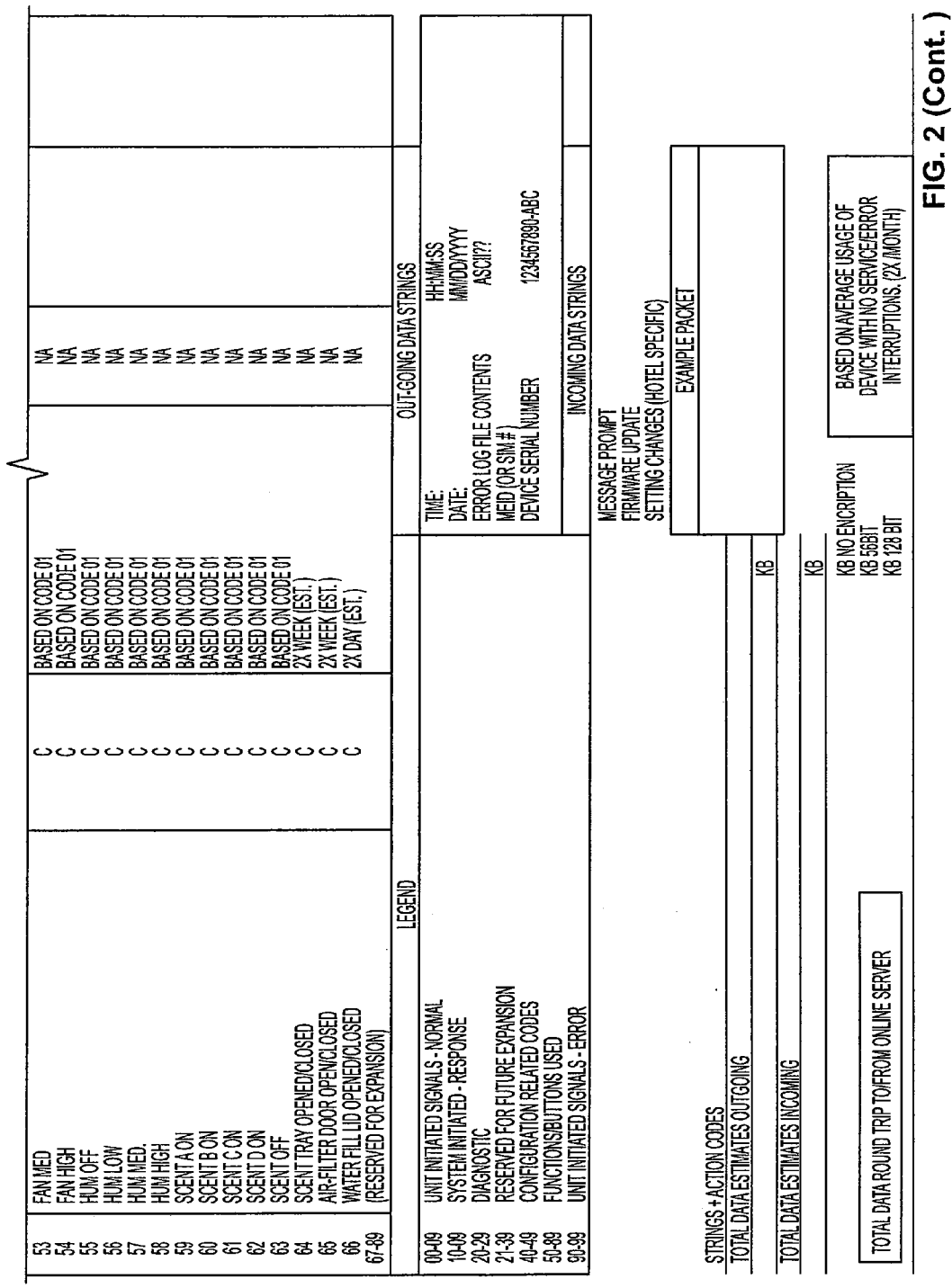
FIG. 2 is a diagram showing a table of diagnostic codes that may be used for remotely managing an environmental control and monitoring device in accordance with an embodiment.

Messages associated with device actions also may be coded to report particular device errors or alerts. For example, device actions may include a diagnostic code associated with a need to replace a consumable (e.g., water or a non-functioning bulb) in an environmental control and monitoring device 104. FIG. 2 is a diagram showing a table of diagnostic codes that may be used for remotely managing an environmental control and monitoring device in accordance with an embodiment. For example, diagnostic (action) codes 200 may be two-digit numerical codes (e.g., 00, 01, 40, etc.) or alphanumeric strings that can be translated to correspond to a description 202 of a specific error, maintenance or repair request, or other detected event associated with an environmental control and monitoring device 104. In one embodiment, one or more diagnostic codes 200 may be associated with a priority level 204 or an estimated or actual timing period for attention 206. Certain diagnostic codes 200 also may be associated with display requests 208 (e.g., at a web portal interface) or other actions 210 (e.g., email messages, etc.). It should be noted that in certain embodiments, environmental control and monitoring devices 104, 106, 108, 110 and 112 may use other schemes for encoding diagnostic codes. For example, four-digit numerical strings may be used for diagnostic codes.

In one embodiment, each occurrence of an event can be associated with an action code. As such, when a device action including an action code is received by environmental control and monitoring device manager 102, the information associated with that action code can be collected, sorted, and analyzed by the environmental control and monitoring device manager 102 to determine a management action.

In certain embodiments, a web portal interface may be provided for administrators to access environmental control and monitoring device manager 102. For example, the web portal interface may display device actions (and associated action codes). The web portal interface also may be capable of organizing and displaying information regarding device actions in various formats. In one embodiment, the web portal interface may be restricted based on an administration status of a user. For example, a user possessing administrator status (e.g., a hotel manager) may be able to view current or previous device actions received from any particular environmental control and monitoring device. However, a user with a more limited administrator status (e.g., a hotel concierge) may only be able to view device actions received from selected environmental control and monitoring device. As such, where the web portal interface may be accessible to different types of users, each type of user may have different levels of access to information as well as ability to view, change, and run functions and view reports online.

In one embodiment, various user roles may include Master Administrators, Billing Administrators, Service Administrators, Hotel Administrators, and Regional Administrators. For example, the web portal interface associated with Master Administrator accounts (e.g., senior management of an entity providing the environmental control and monitoring device manager) may allow users to see all incoming device actions, modify rights and access, run master level reports, and manipulate information as needed for bookkeeping and other functions. Billing Administrators may have access to individual accounts and usable information. Service Administrators may have access to tools to service and update devices as well as to check a status of an error report, and Hotel Administrators may have access to view and run basic reports.

Figure 3:
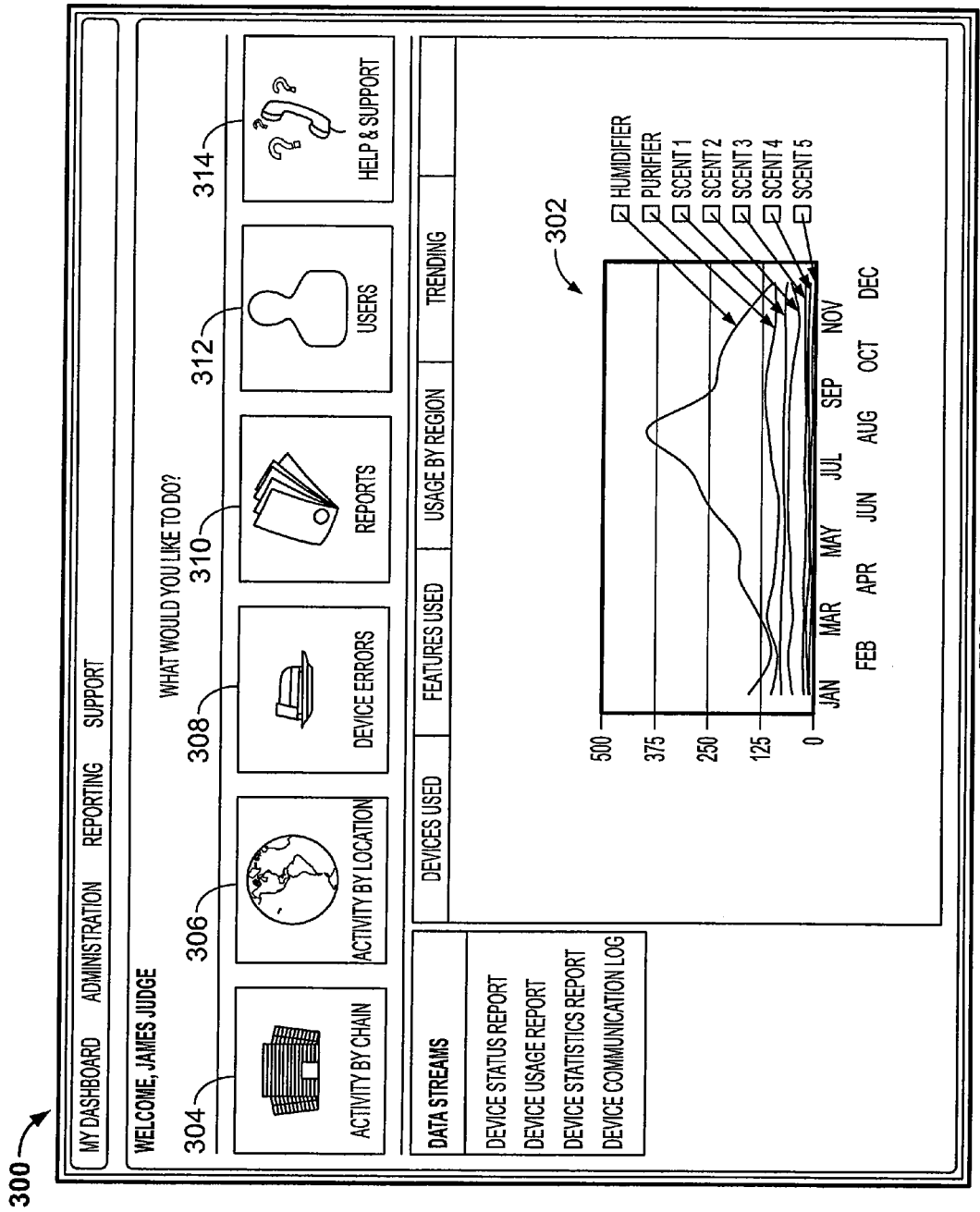
FIG. 3 is a diagram showing a web portal interface display for remotely managing an environmental control and monitoring device in accordance with an embodiment.

FIG. 3 is a diagram showing a web portal interface display for remotely managing an environmental control and monitoring device in accordance with an embodiment. For example, web portal interface 300 may display a graph 302 showing plots representing one or more usage parameters (e.g., usage of a humidifier, purifier and various diffuser scents) and of one or more environmental control and monitoring devices 104. Web portal interface 300 also includes selector buttons for various alternative arrangements of information, including activity by (hotel) chain 304, activity by location 306 and device errors 308. Additional selector buttons include buttons for obtaining device reports 310, user data 312 and help & support 314.

Figure 4:
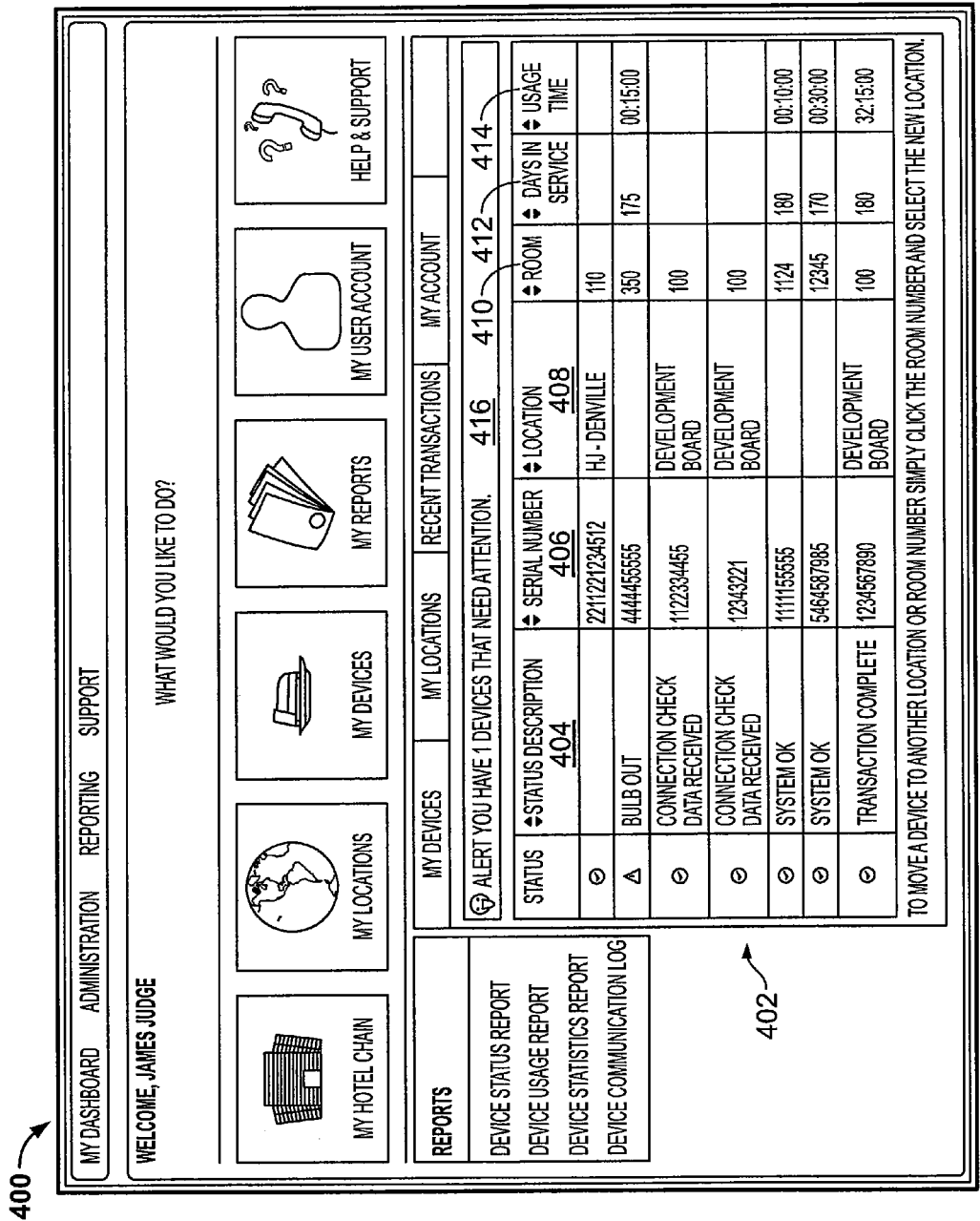
FIG. 4 is another diagram showing a web portal interface display for remotely managing an environmental control and monitoring device in accordance with an embodiment.

FIG. 4 is another diagram showing a web portal interface display for remotely managing an environmental control and monitoring device in accordance with an embodiment. For example, web portal interface 400 may display a device status report 402 that lists device status descriptions 404 for a particular environmental control and monitoring device 104 by serial number 406, specific location 408, room number 410, days in service 412 and usage time 414. In one embodiment, an alert badge 416 may be displayed to call attention to a particular device action regarding a device.

Figure 5:
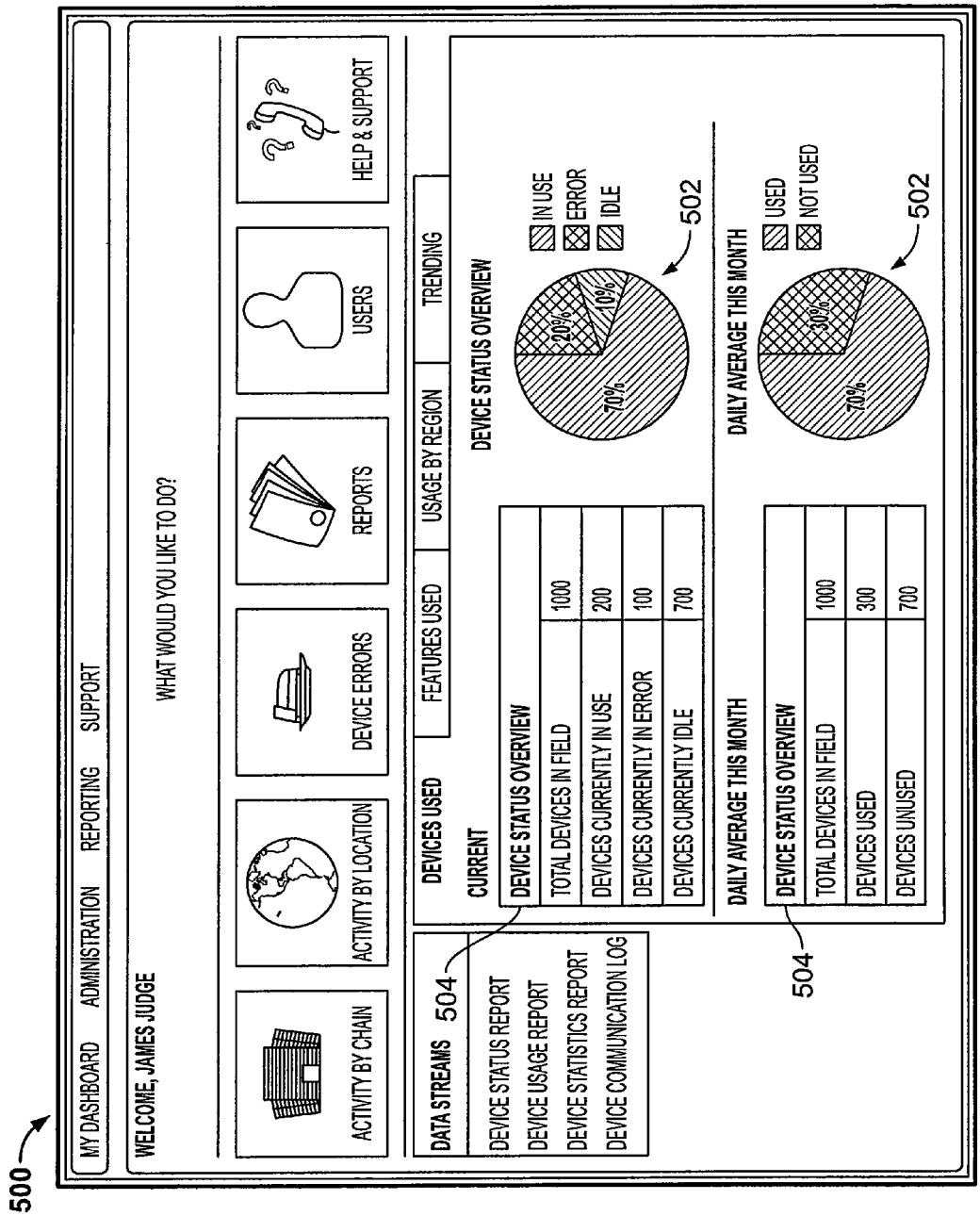
FIG. 5 is another diagram showing a web portal interface display for remotely managing an environmental control and monitoring device in accordance with an embodiment.

FIG. 5 is another diagram showing a web portal interface display for remotely managing an environmental control and monitoring device in accordance with an embodiment. For example, web portal interface 500 may display one or more pie charts 502 showing device performance and one or more associated usage overviews 504, such as an overview of usage over a selected period of time.

Figure 6:
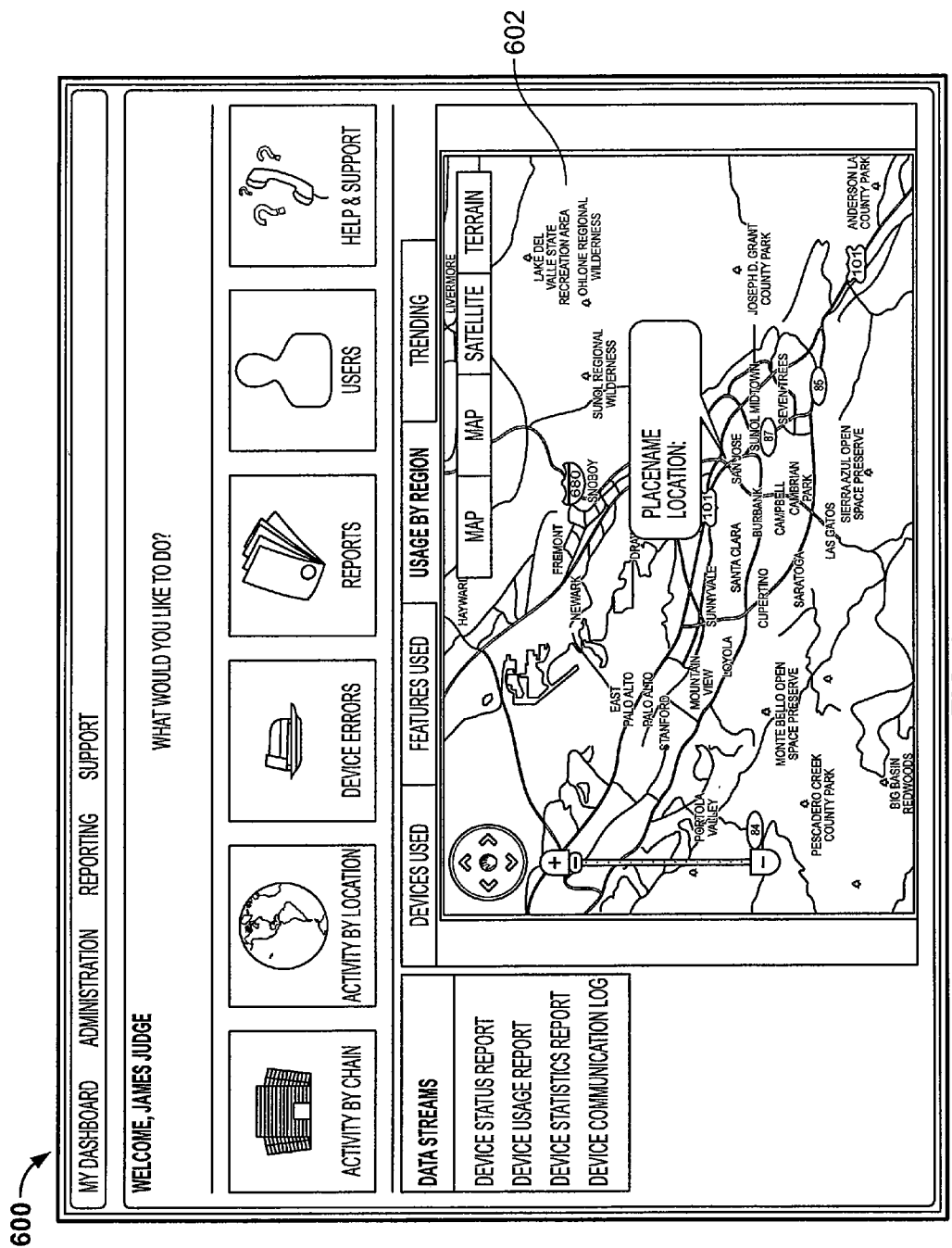
FIG. 6 is another diagram showing a web portal interface display for remotely managing an environmental control and monitoring device in accordance with an embodiment.

FIG. 6 is another diagram showing a web portal interface display for remotely managing an environmental control and monitoring device in accordance with an embodiment. For example, web portal interface 600 may display a map 602 that indicates the current location of a device, or devices reporting a selected status within a selected region. As such, map 602 may be displayed as a regional map including information such as which devices have the highest and lowest usage (e.g., for marketing purposes). For example, an administrator at web portal interface 600 may select an area of map 602 to update device firmware or settings within the selected area.

In some embodiments, the data stored at database 124 may be collected and sold to parties interested in purchasing it, such as marketing companies or organizations interested in usage data related to the environmental control and monitoring devices. For example, the data collected regarding the use and performance of environmental control and monitoring devices may be analyzed in order to generate information that may be useful to improve future generations or versions of environmental control and monitoring devices. Raw or analyzed data also may be shared with the manufacturers of environmental control and monitoring devices. For example, the data received from devices may be utilized for improving the devices through production cost reduction, reduced time to market and increased profitability. In addition, the data collected from devices may be shared with a third-party (e.g., a hotel) for the third-party's internal use or for use in marketing to their customers.

Figure 7:
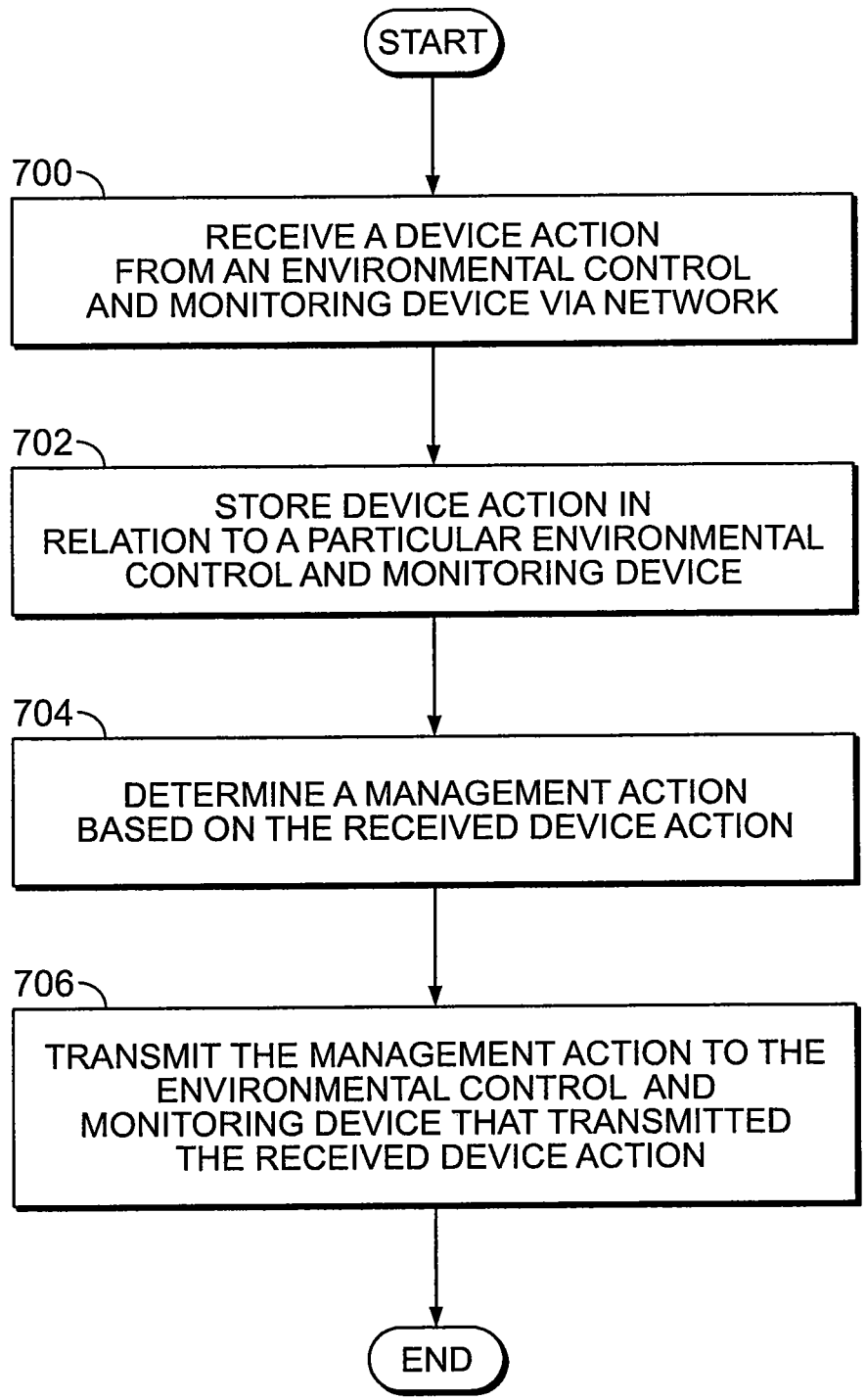
FIG. 7 is a flow diagram for remotely managing an environmental control and monitoring device in accordance with an embodiment.

FIG. 7 is a flow diagram for implementing remote management of an environmental control and monitoring device in accordance with an embodiment. For example, an environmental control and monitoring device 104 (e.g., a networked appliance such as a clothes washer, clothes dryer, refrigerator, HVAC unit, air purifier, humidifier or fragrance diffuser) may be in communication with an environmental control and monitoring device manager 102 via network 100. The environmental control and monitoring device 104 may be located at a remote location, such as a hotel room, cruise ship stateroom or office, and may include a networking module 106 or combinations of networking modules (e.g., Wi-Fi, GPS or other similar modules) for communicating device actions via network 100.

The environmental control and monitoring device 104 may transmit data such as status information to the environmental control and monitoring device manager periodically. For example, the environmental control and monitoring device 104 may transmit device actions at regular intervals (e.g., 1-24 times per day or more). In addition, the environmental control and monitoring device 104 may transmit one or more device actions associated with a particular occurrence, such as a guest request to use the device or an alert condition of the device.

At 700, a device action is received from an environmental control and monitoring device 104 at environmental control and monitoring device manager 102, such as via network 100. For example, the device action may include notification of at least one of an environmental, maintenance, repair or usage status of the environmental control and monitoring device 104. The device action also may indicate one of a consumable resource level, filter status or request from a user of the environmental control and monitoring device 104.

In one embodiment, one or more device actions may be received from a plurality of environmental control and monitoring devices 104, 106, 108, 110 and 112 at 700. In such case, a device action associated with a particular environmental control and monitoring device may be determined based on a unique identifier of the particular environmental control and monitoring device. As such, the device actions may be stored in relation to a particular environmental control and monitoring device at 702, such as for later display via a web portal interface as shown in FIGS. 3-6 above.

At 704, a management action is determined by the environmental control and monitoring device manager 102 based on the received device action. Determining the management action may include determining a command to execute an operation of the environmental control and monitoring device that transmitted the received device action. For example, the management action may include a command to record status information, usage information or other information useful to maintain the proper operation of the environmental control and monitoring device that transmitted the received device action. In addition, the management action may include a command to transmit authorization information, software updates, or other messages to the environmental control and monitoring device. For example, in a hotel environment, environmental control and monitoring device manager 102 may receive a device action from an environmental control and monitoring device that indicates that a guest wishes to use an environmental control and monitoring device. In such case, a first management action may be determined to include a charge room code and a request to transmit a command to the hotel's billing system. Once the hotel's billing system has received the charge room code and authorized the charge, the environmental control and monitoring device manager 102 may determine a second management action to unlock the device for use by the guest. In one embodiment, a hotel guest management system (e.g., third-party manager 126) may store guest access information to allow, change, or limit a guest's ability to activate an environmental control and monitoring device. For example, environmental control and monitoring device manager 102 may receive guest access information from a hotel guest management system (e.g., by transmitting a command as part of a check routine). Environmental control and monitoring device manager 102 may then transmit the guest access information for display at an environmental control and monitoring device (e.g., within a room associated with the guest access information). The environmental control and monitoring device may also be permitted to access, via environmental control and monitoring device manager 102 and network 100, the hotel guest management system for selected guest access information.

At 706, the environmental control and monitoring device manager 102 transmits the management action to the environmental control and monitoring device 104 that transmitted the received device action (such as via network 100). For example, the management action may be transmitted at regular intervals such as for the environmental control and monitoring device to perform an operation at a certain time of the day (e.g., when a guest is expected to return to a hotel room). In various embodiments, the management action may be transmitted wirelessly such as via a cellular network.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. Certain steps of the methods described herein, including one or more of the steps of FIG. 7, may be performed by a server or by another processor in a network-based cloud-computing system. Certain steps of the methods described herein, including one or more of the steps of FIG. 7, may be performed by a client computer in a network-based cloud computing system. The steps of the methods described herein, including one or more of the steps of FIG. 7, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
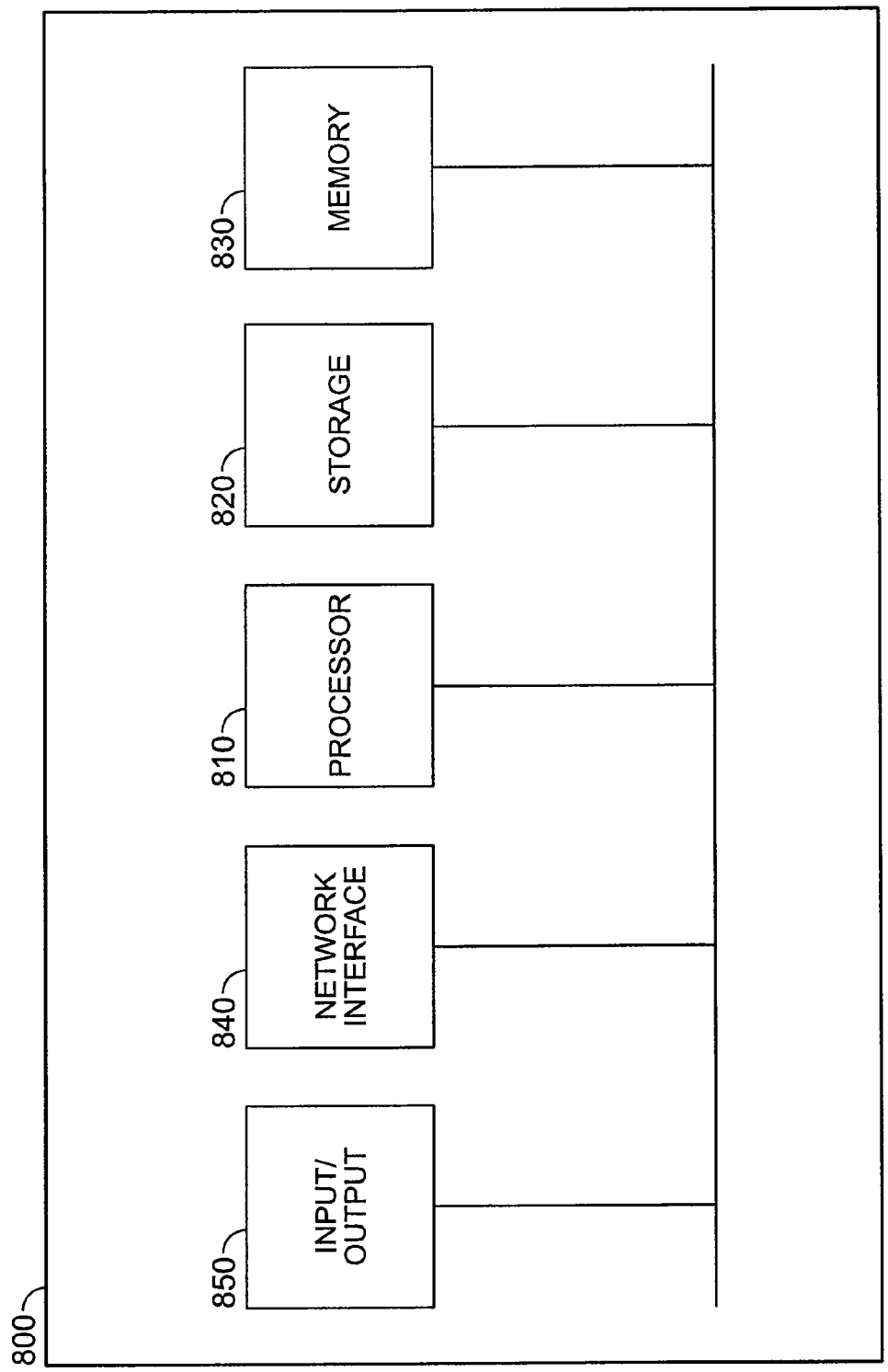
FIG. 8 is a high-level block diagram of an exemplary computer that may be used for remotely managing an environmental control and monitoring device.

A high-level block diagram of an exemplary computer that may be used to implement systems, apparatus and methods described herein is illustrated in FIG. 8. Computer 800 comprises a processor 810 operatively coupled to a data storage device 820 and a memory 830. Processor 810 controls the overall operation of computer 800 by executing computer program instructions that define such operations. The computer program instructions may be stored in data storage device 820, or other computer readable medium, and loaded into memory 830 when execution of the computer program instructions is desired. Thus, the method steps of FIG. 7 can be defined by the computer program instructions stored in memory 830 and/or data storage device 820 and controlled by processor 810 executing the computer program instructions. For example, the computer program instructions can be implemented as computer executable code programmed by one skilled in the art to perform an algorithm defined by the method steps of FIG. 7. Accordingly, by executing the computer program instructions, the processor 810 executes an algorithm defined by the method steps of FIG. 7. Computer 800 also includes one or more network interfaces 840 for communicating with other devices via a network. Computer 800 also includes one or more input/output devices 850 that enable user interaction with computer 800 (e.g., display, keyboard, mouse, speakers, buttons, etc.).

Processor 810 may include both general and special purpose microprocessors, and may be the sole processor or one of multiple processors of computer 800. Processor 810 may comprise one or more central processing units (CPUs), for example. Processor 810, data storage device 820, and/or memory 830 may include, be supplemented by, or incorporated in, one or more application-specific integrated circuits (ASICs) and/or one or more field programmable gate arrays (FPGAs).

Data storage device 820 and memory 830 each comprise a tangible non-transitory computer readable storage medium. Data storage device 820, and memory 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 850 may include peripherals, such as a printer, scanner, display screen, etc. For example, input/output devices 850 may include a display device such as a cathode ray tube (CRT), plasma or liquid crystal display (LCD) monitor for displaying information to the user, a keyboard, and a pointing device such as a mouse or a trackball by which the user can provide input to computer 800.

Any or all of the systems and apparatus discussed herein, including environmental control and monitoring device manager 102 and database 104 may be implemented using a computer such as computer 800. One skilled in the art will note that environmental control and monitoring device manager 102 may be implemented using standard technologies, including software, hardware, firmware or any combination thereof.

One skilled in the art also will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. An apparatus for remotely managing an environmental control and monitoring device, the apparatus comprising:

a memory storing computer program instructions; and
a processor communicatively coupled to the memory, the processor configured to execute the computer program instructions, which, when executed on the processor, cause the processor to perform a method comprising:
receiving, via a network, a device action including an indication of a consumable resource level, a behavioral record, a filter status, a record of one or more previous device actions, a request from a user of the environmental control and monitoring device, and notification of at least one of an environmental, maintenance, repair or usage status of an environmental control and monitoring device; wherein the consumable resource is a resource that must be replaced as a consequence of typical usage of the environmental control and monitoring device;
determining a first management action and a second management action based on the device action;
transmitting to a billing system the first management action, wherein the first management action is associated with billing a user of the environmental control and monitoring device; and
transmitting to the environmental control and monitoring device the second management action, wherein the second management action includes a command to execute an operation of the environmental control and monitoring device.

2. The apparatus of claim 1, wherein the environmental control and monitoring device comprises a networked appliance including one of a clothes washer, clothes dryer, refrigerator, HVAC unit, air purifier, humidifier or fragrance diffuser.

3. The apparatus of claim 1, wherein the second management action is transmitted at regular intervals.

4. The apparatus of claim 1, wherein the second management action is transmitted wirelessly.

5. The apparatus of claim 1, wherein the environmental control and monitoring device is located in one of a hotel room, cruise ship stateroom or office.

6. The apparatus of claim 1, wherein the device action is associated with one or more user actions monitored by the environmental control and monitoring device.

7. The apparatus of claim 1, wherein the method further comprises receiving one or more device actions from a plurality of environmental control and monitoring devices, and determining that a device action is associated with a particular environmental control and monitoring device based on a unique identifier of the particular environmental control and monitoring device.

8. The apparatus of claim 7, wherein the second management action includes the unique identifier of the particular environmental control and monitoring device.

9. The apparatus of claim 8, wherein the second management action includes a command which causes the particular environmental control and monitoring device to execute an operation.

10. The apparatus of claim 7, wherein the method further comprises storing one or more device actions in relation to a particular environmental control and monitoring device.

11. The apparatus of claim 1, wherein the device action comprises a device code, and wherein the method further comprises determining the second management action based, at least in part, on the device code.

12. The apparatus of claim 1, wherein the operation of transmitting the second management action includes transmitting one of a software update, a control message or authorization information to the environmental control and monitoring device.

13. The apparatus of claim 1, wherein the method further comprises displaying the device action based on a unique identifier associated with the environmental control and monitoring device.

14. The apparatus of claim 13, wherein the display of the device action is restricted based on an administration status of a user.

15. A non-transitory computer-readable medium storing computer program instructions for remotely managing an environmental control and monitoring device, which, when executed on a processor, cause the processor to perform a method comprising:
receiving, via a network, a device action including an indication of a consumable resource level, a behavioral record, a filter status, a record of one or more previous device actions, a request from a user of the environmental control and monitoring device, and notification of at least one an environmental, maintenance, repair or usage status of an environmental control and monitoring device; wherein the consumable resource is a resource that must be replaced as a consequence of typical usage of the environmental control and monitoring device;
determining a first management action and a second management action based on the device action;
transmitting to a billing system the first management action, wherein the first management action is associated with billing a user of the environmental control and monitoring device; and
transmitting to the environmental control and monitoring device the second management action, wherein the second management action includes a command to execute an operation of the environmental control and monitoring device.

16. The non-transitory computer-readable medium of claim 15, wherein the environmental control and monitoring device comprises a networked appliance including one of a clothes washer, clothes dryer, refrigerator, HVAC unit, air purifier, humidifier or fragrance diffuser.

17. The non-transitory computer-readable medium of claim 15, wherein the second management action is transmitted at regular intervals.

18. The non-transitory computer-readable medium of claim 15, wherein the second management action is transmitted wirelessly.

19. The non-transitory computer-readable medium of claim 15, wherein the device action is associated with one or more user actions monitored by the environmental control and monitoring device.

20. The non-transitory computer-readable medium of claim 15, wherein the method further comprises receiving one or more device actions from a plurality of environmental control and monitoring devices, and determining that a device action is associated with a particular environmental control and monitoring device based on a unique identifier of the particular environmental control and monitoring device.

21. The non-transitory computer-readable medium of claim 20, wherein the second management action includes the unique identifier of the particular environmental control and monitoring device.

22. The non-transitory computer-readable medium of claim 21, wherein the second management action includes a command which causes the particular environmental control and monitoring device to execute an operation.

23. The non-transitory computer-readable medium of claim 20, wherein the method further comprises storing one or more device actions in relation to a particular environmental control and monitoring device.

24. The non-transitory computer-readable medium of claim 15, wherein the device action comprises a device code, and wherein the method further comprises determining the second management action based, at least in part, on the device code.

25. The non-transitory computer-readable medium of claim 15, wherein the operation of transmitting the second management action includes transmitting one of a software update, a control message or authorization information to the environmental control and monitoring device.

26. The non-transitory computer-readable medium of claim 15, wherein the method further comprises displaying the device action based on a unique identifier associated with the environmental control and monitoring device.

27. The non-transitory computer-readable medium of claim 26, wherein the display of the device action is restricted based on an administration status of a user.

28. A method for remotely managing an environmental control and monitoring device, the method comprising:
receiving, via a network, a device action including an indication of a consumable resource level, a behavioral record, a filter status, a record of one or more previous device actions, a request from a user of the environmental control and monitoring device, and notification of at least one of an environmental, maintenance, repair or usage status of an environmental control and monitoring device, wherein the consumable resource is a resource that must be replaced as a consequence of typical usage of the environmental control and monitoring device;
determining a first management action and a second management action based on the device action;
transmitting to a billing system the first management action, wherein the first management action is associated with billing a user of the environmental control and monitoring device; and
transmitting to the environmental control and monitoring device the second management action, wherein the second management action includes a command to execute an operation of the environmental control and monitoring device.

29. The method of claim 28, wherein the environmental control and monitoring device comprises a networked appliance including one of a clothes washer, clothes dryer, refrigerator, HVAC unit, air purifier, humidifier or fragrance diffuser.

30. The method of claim 28, wherein the second management action is transmitted at regular intervals.

31. The method of claim 28, wherein the second management action is transmitted wirelessly.

32. The method of claim 28, wherein the environmental control and monitoring device is located in one of a hotel room, cruise ship stateroom or office.

33. The method of claim 28, wherein the device action is associated with one or more user actions monitored by the environmental control and monitoring device.

34. The method of claim 28, further comprising receiving one or more device actions from a plurality of environmental control and monitoring devices, and determining that a device action is associated with a particular environmental control and monitoring device based on a unique identifier of the particular environmental control and monitoring device.

35. The method of claim 34, wherein the second management action includes the unique identifier of the particular environmental control and monitoring device.

36. The method of claim 35, wherein the second management action includes a command which causes the particular environmental control and monitoring device to execute an operation.

37. The method of claim 34, further comprising storing one or more device actions in relation to a particular environmental control and monitoring device.

38. The method of claim 28, wherein the device action comprises a device code, and wherein the method further comprises determining the second management action based, at least in part, on the device code.

39. The method of claim 28, wherein the operation of transmitting the second management action includes transmitting one of a software update, a control message or authorization information to the environmental control and monitoring device.

40. The method of claim 28 further comprising displaying the device action based on a unique identifier associated with the environmental control and monitoring device.

41. The method of claim 40, wherein the display of the device action is restricted based on an administration status of a user.

* * * * *